Figure 1:
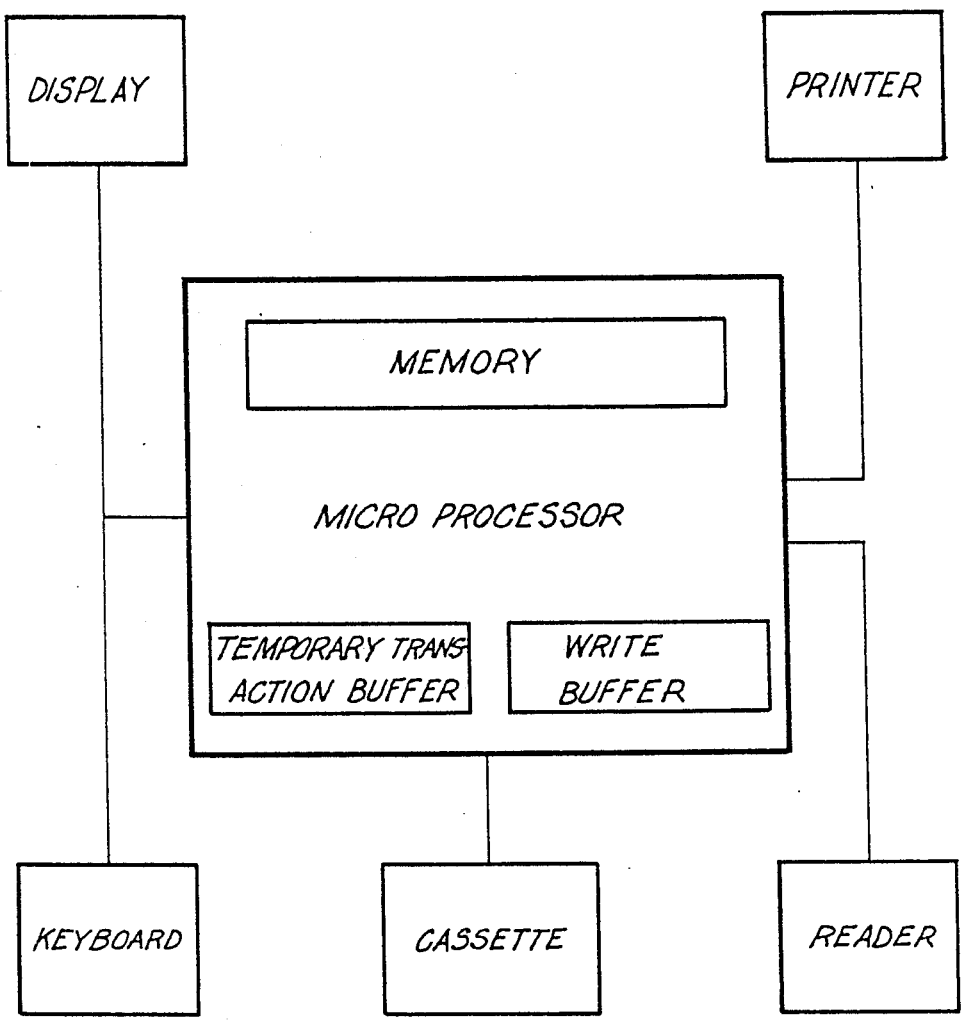

United States Patent [19]

Richardson et al.

[11] Patent Number: 4,747,049
[45] Date of Patent: May 24, 1988

[54] POINT OF SALE DEVICE FOR THE COLLECTION OF SALES DATA

[75] Inventors: Hugh W. Richardson, Shenton Park; Donald K. Philp, Caulfield; Raymond V. Lewis, Applecross; Bernard T. Eastman, City Beach, all of Australia

[73] Assignee: Motorcharge Pty. Ltd., West Perth, Australia

[21] Appl. No.: 491,428

[22] PCT Filed: Jun. 11, 1982

[86] PCT No.: PCT/AU82/00095

§ 371 Date: Dec. 16, 1983

§ 102(e) Date: Dec. 16, 1983

[87] PCT Pub. No.: WO83/00575

PCT Pub. Date: Feb. 17, 1983

[30] Foreign Application Priority Data

Aug. 5, 1981 [AU] Australia ............... PF0063

[51] Int. Cl.⁴ ............ G06F 15/22; G06F 3/02; G06F 3/08
[52] U.S. Cl. ................... 364/405; 235/380
[58] Field of Search ........... 364/405, 406; 235/379, 235/380, 382, 381; 340/825.35, 825.33

[56] References Cited

U.S. PATENT DOCUMENTS

| 3,648,020 | 3/1972 | Tateisi et al. ............ 340/825.33 X |
| 3,931,497 | 1/1976 | Gentile et al. ............ 235/381 |
| 3,970,992 | 7/1976 | Boothroyd et al. ............ 364/406 X |
| 4,001,568 | 1/1977 | Iizuka et al. ............ 235/379 X |
| 4,011,433 | 3/1977 | Tateisi et al. ............ 340/825.35 X |
| 4,011,434 | 3/1977 | Hockler et al. ............ 235/377 |
| 4,199,100 | 4/1980 | Wostl et al. ............ 235/381 |
| 4,262,333 | 4/1981 | Horigome et al. ............ 364/406 X |
| 4,264,808 | 4/1981 | Owens et al. ............ 235/379 |
| 4,314,352 | 2/1982 | Fought et al. ............ 364/900 |
| 4,319,336 | 3/1982 | Anderson et al. ............ 235/380 X |
| 4,322,796 | 3/1982 | Uchida et al. ............ 364/405 |
| 4,385,285 | 5/1983 | Horst et al. ............ 382/7 X |
| 4,395,626 | 7/1983 | Barker et al. ............ 235/381 |
| 4,395,627 | 7/1983 | Barker et al. ............ 235/381 |
| 4,454,414 | 6/1984 | Benton ............ 364/406 X |
| 4,460,965 | 7/1984 | Trehn et al. ............ 364/406 |
| 4,493,037 | 1/1985 | Takano et al. ............ 364/406 X |

FOREIGN PATENT DOCUMENTS

| 455429 | 4/1972 | Australia ............ 364/405 |
| 461881 | 3/1973 | Australia ............ 364/415 |
| 462213 | 6/1975 | Australia ............ 364/415 |
| 492443 | 9/1975 | Australia ............ 364/408 |
| 59-111565 | 6/1984 | Japan ............ 235/381 |
| 21058/70 | 4/1972 | United Kingdom ............ 364/405 |
| 1522587 | 8/1978 | United Kingdom ............ 364/405 |

Primary Examiner—Jerry Smith
Assistant Examiner—Charles B. Meyer
Attorney, Agent, or Firm—Harness, Dickey & Pierce

[57] ABSTRACT

A self-contained intelligent point of sale device for the collection of sales data on presentation of a valid identification card, the device comprising a microprocessor having a memory and a buffer, a keyboard for entering information concerning one or more transactions into the buffer, a recording unit interfaced with the microprocessor and a reader interfaced with the microprocessor for reading and checking the identification card against the memory whereby when the memory recognizes a valid identification card, the information concerning the transaction or transactions entered into the buffer is transferred to and recorded in the recording unit together with particulars from the identification card.

14 Claims, 2 Drawing Sheets

|  |  |  |
|---|---|---|
|  |  |  |
| DATE | CHECK UNIT | CHECK CARD |

| | | |
|---|---|---|
| 7 | 8 | 9 |
| 4 | 5 | 6 |
| 1 | 2 | 3 |
| 0 | SHIFT | CLEAR |

| | |
|---|---|
| ODO | D13 |
| D6 | D12 |
| D5 | D11 |
| D4 | D10 |
| D3 | D9 |
| D2 | D8 |
| D1 | D7 |

Fig. 2

POINT OF SALE DEVICE FOR THE COLLECTION OF SALES DATA

This invention relates to a self-contained intelligent point of sale device for the collection of sales data on presentation of valid identification card.

The object of the invention is to provide a data collection device which can be used to control and record the sales of commodities or services on a credit basis at the point of sale. It is a particular object to provide such a device which is suitable for controlling the sale of motor fuel and associated products using an identification card valid for one point of sale only.

Broadly the invention resides in a self-contained intelligent point of sale device for the collection of sales data on presentation of a valid identification card, said device comprising a microprocessor having a memory and a buffer, a keyboard for entering information concerning one or more transactions into the buffer, a recording unit interfaces with the microprocessor and a reader interfaced with the microprocessor for reading and checking the identification card against the memory whereby when the memory recognizes a valid identification card, the information concerning the transaction or transactions entered onto the buffer is transferred to and recorded in the recording unit together with particulars from the identification card.

Preferably the device also incorporates a display connected to the keyboard to display the entered information and/or signals generated by the microprocessor. The device may also include a printing unit for printing out a paper copy record setting out the entered information.

The invention will be better understood by reference to the following description of one specific embodiment as applied to the sale of motor fuel and associated products on a credit basis using identification cards supplied to individual customers. In this embodiment the use of the identification card is confined to a single sales point such as a service station.

In describing the embodiment reference will be made to the accompanying drawings wherein FIG. 1 is a block diagram illustrating the system; and FIG. 2 is a diagramatic representation of the keyboard.

The identification card issued to each customer is of conventional size and shape and has appropriate data recorded thereon in suitable form such as magnetic strip or embedded wires and includes a symbol which may be a number or combination of letters and numbers unique to that particular card. A card particularly suitable for the purposes of the present invention is that sold under the trade mark "Sensorcard" which has the appearance of a normal plastic credit card. It has wires embedded in the card representing that card's unique identifying symbol.

The microprocessor is of conventional design and is of sufficient capacity to recognize the valid and invalid card codes relative to the total number of customers of the service station and to perform all control functions required to drive a recording unit interfaces therewith, a printing unit for the production of hard or paper copy receipts and journal rolls as hereinafter described, a display, and a card reader. The microprocessor contains a memory of sufficient capacity to retail the following data:

(i) the date
(ii) the price of fuel
(iii) limits on the amount of transaction relating to any particular product
(iv) one or more ranges of symbols for identifying cards
(v) the symbols of invalid identifying cards within the specified ranges.
(vi) numbers to identify each transaction.

It also incorporates two buffers both of which are of sufficient capacity to retain the following data:
(a) the particulars relating to one or more transactions (in practice eight transactions can be stored in the buffer at the same time)
(b) card identifying symbol.

The first buffer is known as a temporary transaction buffer while the second buffer is known as the write buffer, and both are used to temporarily hold data prior to transmission to data storage - for example to magnetic tape.

The system is powered by a power supply which will allow intermittent fluctuation in main voltage without rendering the system inoperative and which will maintain memory for a period of at least two months following withdrawal of main power.

The keyboard unit as shown in FIG. 2 which may be the mechanical or touch type comprises three separate banks of keys, the first bank comprises a numeric 0 to 9 keypad plus shift and clear keys, the second bank comprises a group of six keys controlling certain functions of the unit and the third bank comprises a group of fourteen keys each of which is related to the one particular product sold by the service station. Operation of the shift key in the first bank of keys enables the group of fourteen product keys to be used for a further range of fourteen products or services provided by the service station. This arrangement may be modified, or added to the facilitate user operation.

The display may be fluorescent, neon, LED or the like and of sufficient size and clarity to provide sufficient characters for the key input and to display error messages produced by the microprocessor. In practice an eight digit display has been found to be satisfactory.

The recording unit is of a conventional cassette type utilising standard data cassettes and is capable of reading and writing. A unit particularly suitable for the purposes of the present invention is the TEAC MT-2 Datapack Cassette digital magnetic tape memory system. Equivalently electronic memory chips may be used to store data in place of the cassette unit. Two printing units are used to print a hard or paper copy customer receipt for each purchase together with a duplicate roll in journal copy form in a format suitable for manual data capture should the data recorded on the cassette be not able to be read. A suitable printer is the Olivette PU1800 twenty character thermal printer.

The Manager of the service station is provided with a control card of the same form as a customer's identification card which can be readily recognized by the memory as a control card and this enables him to set the unit for operation at the commencement of each day and to close down the unit at the end of the days operations.

The operation of the system is as follows:

The microprocessor is programmed so that there is recorded in its memory one or more ranges of symbols representing the identification cards valid for that particular service station and the symbols for any invalid cards within the aforesaid ranges. Also recorded in the memory is a symbol identifying the particular service station.

The operator inserts a tape into the cassette and when the device is switched on the microprocessor checks the tape to ensure that it carries the appropriate service station identifying symbol or is blank. If it does not carry the identifying symbol or is not blank the display displays an appropriate error indicator and instruction.

If the tape is correct the device then searches the tape to check if there are any changes in the control cards symbols, the range of valid card symbols and any invalid card symbols and these are recorded in the memory of the microprocessor. After being searched the tape is stopped at the point where it is free to record transaction data. The service station manager then enters the date through the keyboard and presses the date key in the first bank of keys after which he passes his control card through the reader. The date is thus recorded in memory and the printer operates to print out the date as a check for the manager. If the price of the fuel has to be changed the manager enters the new price presses the shift key and the cost/litre key and passes his control card through the reader. This transfers the new price to the write buffer and to the microprocessor. It is eventually transferred from the write buffer to the tape.

To record a transaction an operator presses the numeric keys to enter the cost of say the fuel sold to a customer.

The cost of any other products sold to the customer is also entered and the appropriate product key or keys pressed. If the customer so desires his odometer reading can be fed in through the keyboard and the ODO key pressed. The customer card is then read by the reader, and if valid, accepted by the terminal. A copy of the completed transaction is printed on the journal roll and the receipt roll. The receipt is torn off the receipt roll and handed to the customer. When a total of eight transactions are recorded in the write buffer the microprocessor activates the tape and the information is transferred to the tape.

If an invalid card is presented to the reader it clears the temporary transaction buffer and displays the invalid card symbol and gives an audible signal. This indicates to the operator that the card is invalid at that site.

Contemporaneously with the recording of transactions information such as the value of products sold is recorded in the memory as a running total for each product.

At the end of the day's operations the operator presses the appropriate key in the second bank and then he passes his control card through the reader which initiates the unit to produce a print out giving the totals of each product sold, and a grand total as well as the terminal identifying symbol. The same information is recorded on the journal roll. The tape is then removed and returned to a control office where the information thereon may be processed by a large computer to produce a monthly statement for each customer and which may include a calculation of the fuel consumption if the odometer recordings have been fed in. At appropriate periodical intervals the large computer produces a remittance advice and a check for payment to the service station.

If desired an operator may attend on the service station and through appropriate equipment "milk" the information from the cassette or the electronic memory chips, if used. Alternatively, the tape may be "milked" through a suitable land line connection.

The claims defining the invention are as follows:
We claim:

1. A self-contained intelligent point of sale device for the collection of sales data on presentation of a valid identification card, said device comprising a miroprocessor having a memory and a buffer, a keyboard for entering information concerning one or more transactions into the buffer, a read/write store interfaced with the microprocessor, said read/write store being operable in a read mode for entering into the memory data enabling recognition of the valid card and operable in a write mode for receiving and storing data, and a reader interfaced with a microprocessor for reading data from the identification card, said microprocessor comparing data from the identification card against the data stored in the memory for verifying a valid identification card, the information concerning the transaction entered into the buffer being transferred to and stored in the recording unit read/write store together with data from the identification card upon the verification of a valid identification card.

2. A device as claimed in claim 1 which incorporates a display connected to the keyboard to display the entered transaction data.

3. A device as claimed in claim 2 wherein the microprocessor incorporates two buffers, one functioning as a temporary transaction buffer and the other as a write buffer to temporarily hold data prior to transmission to the read/write store.

4. A device as claimed in claim 2 wherein the read/write store comprises a recording unit having play back and recording facilities.

5. A device as claimed in claim 2 wherein the write mode of the read/write store comprises at least one electronic memory chip.

6. A device as claimed in claim 2 including a printing unit for printing a hard or paper copy receipt setting out the entered information and the data read from the identification card.

7. A device as claimed in claim 1 wherein the microprocessor incorporates two buffers, one functioning as a temporary transaction buffer and the other as a write buffer to temporarily hold data prior to transmission to the read/write store.

8. A device as claimed in claim 7 wherein the read/write store comprises a recording unit having play back and recording facilities.

9. A device as claimed in claim 7 wherein the write mode of the read/write store comprises at least one electronic memory chip.

10. A device as claimed in claim 7 including a printing unit for printing a hard or paper copy receipt setting out the entered information and the data read from the identification card.

11. A device as claimed in claim 1 wherein the read/write store comprises a recording unit having play back and recording facilities.

12. A device as claimed in claim 1 wherein the write mode of the read/write store comprises at least one electronic memory chip.

13. A device as claimed in claim 1 including a printing unit for printing a hard or paper copy receipt setting out the entered information and other details of the transaction and the data read from the identification card.

14. A device as claimed in claim 13 including a second printing unit for producing a journal roll setting out the entered information and the data read from the identification card.

* * * * *